Oct. 12, 1937.  D. M. NEFF  2,095,557

DISHWASHING MACHINE

Filed Aug. 12, 1936

Inventor

Douglas M. Neff

By Fisher, Moser + Moore

Attorneys

Patented Oct. 12, 1937

2,095,557

UNITED STATES PATENT OFFICE 2,095,557

DISHWASHING MACHINE

Douglas M. Neff, North Madison, Ohio

Application August 12, 1936, Serial No. 95,600

4 Claims. (Cl. 141—9)

The present invention relates to improvements in dish washing machines, and has for its general object to provide a simple, durable and efficient device of this character which is easy to operate.

Other objects and advantages of the invention will be apparent from the following specification considered with the accompanying drawing, in which.

Figure 1:
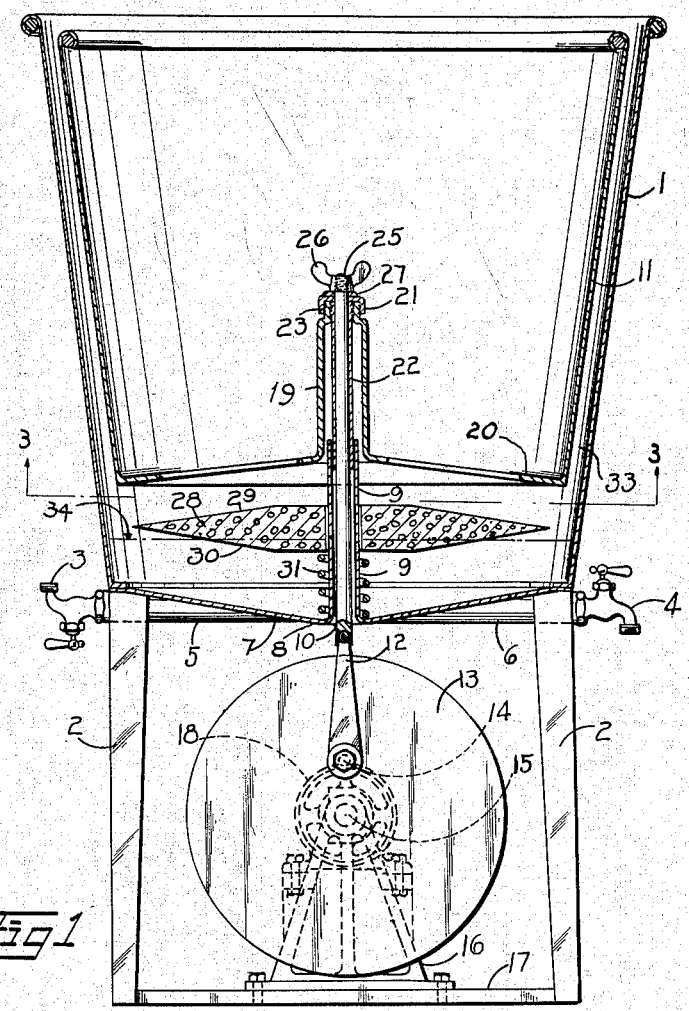
Figure 1 is a transverse sectional view through the dish washing machine according to the invention.
Figure 3:
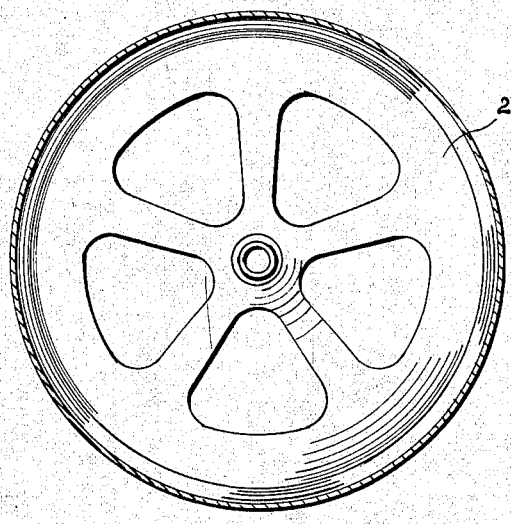
Figure 3 is a horizontal sectional view on line 3—3 of Figure 1.
Figure 2:
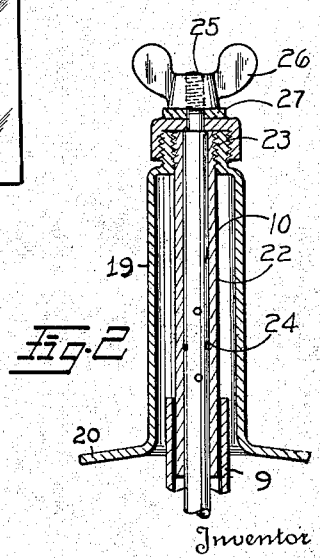
Figure 2 is an enlarged sectional view showing the connection between the dish basket and the operating shaft.

Referring more particularly to the drawing 1 denotes a water receptacle, preferably circular in form, and mounted upon supporting legs 2. Hot water is supplied to the receptacle 1 through a faucet 3, and the waste water is suitably disposed of by means of a faucet 4. Pipes 5 and 6 place the respective faucets in communication with the conically shaped bottom 7 of the receptacle. Integrally formed with and projecting upwardly from the central portion 8 of the bottom 7 is a guide sleeve 9, through which a rod 10 is adapted to reciprocate. This rod is connected at its upper end to and supports a dish basket 11, in a manner hereinafter described.

The lower end of reciprocating rod 10 is pivotally secured to one end of a link 12, the other end of which is pivoted to a disk 13, by means of an eccentrically arranged pin 14. This disk 13 is concentrically mounted upon and for rotation with a stub shaft 15, having its bearing in a bracket 16, in turn bolted to a base plate 17 spanning the supporting legs 2. Any suitable power may be employed for driving the shaft 15, such as an electric motor 18.

The dish basket 11, like the receptacle 1 is of conical form, and is enclosed by the latter for relative reciprocatory movement with respect thereto. As previously stated, the basket 11 is secured to and reciprocates with the vertically disposed rod 10, when the shaft 15 is rotated. Thus a centrally disposed tubular portion 19, projecting upwardly from the spider-like inverted cone-shaped bottom 20, of the dish basket is provided at its reduced upper end with a threaded cap 21. A tube 22, enclosing the reciprocating rod or shaft 10 is threadedly connected to the tubular portion 19 as at 23, and the rod and tube 22 are connected to each other in any suitable manner, such as by welding 24 or the like. The reduced threaded end 25 of the rod 10 passes through an opening in the cap for the reception of a wing nut 26, a washer 27 being preferably inserted between the cap and the wing nut to insure a tight seal.

A float 28, having oppositely beveled top and bottom faces 29 and 30, loosely mounted for sliding reciprocatory movement on the guide sleeve 9, rests upon a cushioning expansion coil spring 31, in turn seated upon the central portion 8 forming a part of the bottom of the water receptacle 1. It should be noted that the dishes being washed will remain erect due to the inclination or shape of the bottom 20 of the basket 11.

When the stub shaft 15 is rotated the rod or shaft 10 and the basket 11, carried by the rod, will be caused to reciprocate up and down within the water receptacle 1, toward and away from the bottom 7 of said receptacle. On the downward stroke of the basket 11, the conical bottom 32 of the latter seats upon the correspondingly shaped top face 29 of the float 28, thus closing the bottom and preventing the escape of water as the stroke is continued and the float descends with the basket against the tension of spring 31. The space 33 between the correspondingly inclined walls of the basket and the water receptacle is gradually reduced or narrowed, as the downward stroke progresses. Consequently the water will be forced up through this passage and thence into and down through the basket. On the return or up stroke of the basket, the bottom of the latter being uncovered as it moves away from the float, the water will rush out through the bottom with a quick flushing action.

Due to the downward and inward taper or inclination of the opposing walls of the water receptacle a minimum amount of water is necessary, as indicated by the water line 34, shown in Figure 1. Practically all of the water used will first be forced upwardly around and then downwardly into the basket and down through the dishes therein, while the bottom of the basket is closed, and will then surge through the bottom as the basket moves away from the float. As this movement is very rapid, the dishes can be cleaned in a few moments. When cleaned and rinsed the dishes may if desired be removed by lifting out the basket, it being merely necessary to first unscrew the wing nut 26 and rotate the basket so that the tube 19 will be unscrewed from the tube 22.

Having thus described my invention, what I claim is:

1. A dish washing machine comprising a substantially cylindrical water receptacle, a substantially cylindrical dish receptacle within said water receptacle having a perforated bottom and of slightly smaller cross section than said water receptacle, means for vertically reciprocating said dish receptacle, and a float within said water receptacle below and opposite the perforated bottom of said dish receptacle, said float closing the perforations of the bottom of said dish receptacle during downward movement of said dish receptacle and openly exposing said perforations when said dish receptacle is moved upwardly.

2. A dish washing machine comprising a substantially cylindrical water receptacle having a centrally disposed hollow guide member projecting upwardly from the bottom thereof, a dish receptacle within said water receptacle having a perforated bottom and a centrally disposed upwardly extending tubular member, loosely sleeved upon said guide member, a shaft connected to the top portion of said tubular member and extended through said guide member, means connected to the free end of said shaft for reciprocating same and means loosely sleeved upon said guide member opposite the bottom of said dish receptacle for automatically closing the perforations in the bottom of said dish receptacle, when shifted downwardly and freely exposing said perforations during upward movement of said dish receptacle.

3. A dish washing machine as described in claim 2, wherein the means sleeved upon said guide member embodies a float, seated upon and cooperating with a cushioning expansion spring, the upper surface of said float being shaped to tightly seat against the bottom of said dish receptacle for sealing the perforations therein during downward movement of said dish receptacle.

4. A dish washing machine comprising a water receptacle of inverted cone-shaped form, a perforated dish receptacle of less height and similar cone-shaped form within said water receptacle, means for vertically reciprocating said dish receptacle within said water receptacle, and a float vertically slidably arranged within said water receptacle below and opposite said dish receptacle for closing the perforations of said dish receptacle, when same is shifted downwardly, said float being inoperative when said dish receptacle is shifted upwardly, and the circumferential wall of said dish receptacle closely approaching the wall of said water receptacle during the downward movement of said dish receptacle.

DOUGLAS M. NEFF.